R.C. Wood,
Harvester Pitman.

No. 95,548.    Patented. Oct. 5, 1869.

Witnesses:
Chas. Nida
Jno. R. Brooks

Inventor:
R. C. Wood,
per Mimms & Co.
Attorneys.

UNITED STATES PATENT OFFICE.

RUFUS C. WOOD, OF LE ROY, KANSAS.

IMPROVEMENT IN PITMAN-CONNECTIONS FOR HARVESTERS.

Specification forming part of Letters Patent No. 95,548, dated October 5, 1869.

*To all whom it may concern:*

Be it known that I, RUFUS C. WOOD, of Le Roy, in the county of Coffey and State of Kansas, have invented a new and Improved Sickle-Bar Coupling for Mowers and Reapers; and I do hereby declare that the following is a full, clear, and exact description thereof, which will enable others skilled in the art to make and use the same, reference being had to accompanying drawings, forming a part of this specification.

Figure 1:
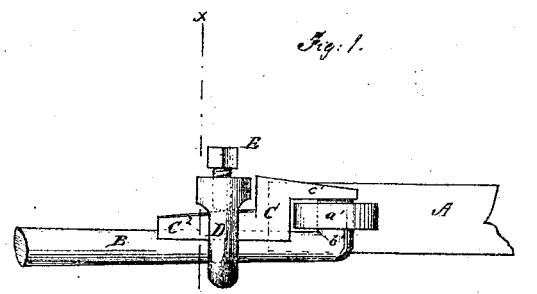
Figure 2:
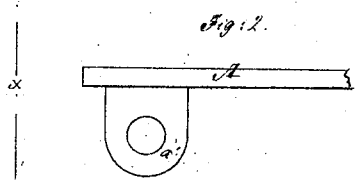
Figure 3:
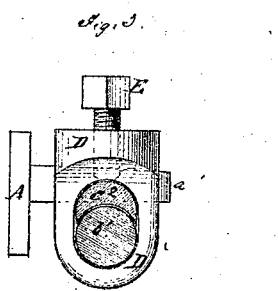

Figure 1 is a detail top view of a portion of a sickle-bar and pitman to which my improvement has been attached. Fig. 2 is a detail side view of the end of the sickle-bar. Fig. 3 is a detail sectional view of the same, taken through the line $x\ x$, Fig. 1.

My invention has for its object to furnish an improved coupling for connecting the pitman and sickle-bar of a reaper or mower to diminish the wear of a coupling pin and eye and prevent the end shake of the sickle-bar, and which shall at the same time be simple in construction and easily attached; and it consists in the detachable seat and clamping loop and screw, in combination with the pitman and sickle-bar, as hereinafter more fully described.

A represents the sickle-bar, upon the end of which is formed an eye, $a'$, in the ordinary manner, to receive the coupling-pin $b$, formed upon the end of the pitman B in the ordinary manner.

C is the seat, the body of which rests against the edge of the eye $a'$, and which is provided with arms $c'\ c^2$, projecting in opposite directions from the opposite ends of the body of the said seat C. The inner side of the arm $c'$ rests upon the ends of the coupling-pins $b'$, doing away with the key now in use, and the other arm, $c^2$, one side of which is made concave and the other convex, rests with its concave side upon the side of the pitman B.

D is a loop which passes over the end of the pitman B and receives the arm $c^2$ of the seat C.

E is a screw, the head of which is so formed as to be grasped with a wrench, and which passes through a screw-hole in the loop D, and the forward end of which rests against the arm $c^2$ of the seat C, so that by turning the said screw forward the said seat C may be securely clamped in place. This construction, by removing a portion of the wear from the eye $a'$ and pin $b'$, protects said eye and pin, and at the same time, by being adjustable, enables the wear to be taken up, so as to prevent the end shake of the sickle-bar.

Having thus described my invention, what I claim as new, and desire to secure by Letters Patent, is—

The seat C $c'\ c^2$, constructed as described, loop D, and screw E, in combination with the sickle-bar A $a'$ and pitman B $b'$, substantially as herein shown and described, and for the purposes set forth.

RUFUS C. WOOD.

Witnesses:
E. E. BACON,
A. R. QUIGG.